(12) United States Patent
Ferris et al.

(10) Patent No.: US 6,246,003 B1
(45) Date of Patent: *Jun. 12, 2001

(54) SEALING ENCLOSURE DEVICE

(76) Inventors: Ian Ferris, 4 Kelsey Avenue, Finchamstead, Berkshire, RG11 4TZ; Maxwell Lowe, 9 St Michaels Road, Cirencester, Gloucestershire, GL7 1NB, both of (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/983,622
(22) PCT Filed: Jul. 26, 1996
(86) PCT No.: PCT/GB96/01826
§ 371 Date: Jan. 21, 1998
§ 102(e) Date: Jan. 21, 1998
(87) PCT Pub. No.: WO97/05671
PCT Pub. Date: Feb. 13, 1997

(30) Foreign Application Priority Data

Jul. 28, 1995 (GB) .................................................. 9515502

(51) Int. Cl.[7] .................................................. H02G 15/08
(52) U.S. Cl. .......................................... 174/92; 174/84 R
(58) Field of Search ............................. 174/92, 93, 74 R, 174/88 R, 77 R

(56) References Cited

U.S. PATENT DOCUMENTS

| | | | |
|---|---|---|---|
| 3,183,302 | * 5/1965 | Wochner et al. | 174/138 |
| 3,484,541 | * 12/1969 | Campbell | 174/138 |
| 4,718,678 | 1/1988 | Vansant | 277/1 |
| 4,795,857 | * 1/1989 | McInnis et al. | 174/138 F |
| 5,371,323 | 12/1994 | Schneider et al. | 174/92 |
| 5,397,859 | 3/1995 | Robertson et al. | 174/92 |
| 5,561,269 | * 10/1996 | Robertson et al. | 174/92 |
| 5,763,835 | * 6/1998 | Huynh-Ba et al. | 174/92 |
| 5,828,005 | * 10/1998 | Huynh-Ba et al. | 174/92 |
| 5,859,388 | * 1/1999 | Allen et al. | 174/77 R |
| 5,900,585 | * 5/1999 | Winfield et al. | 174/74 R |
| 5,952,612 | * 9/1999 | Winfield et al. | 174/74 R |

FOREIGN PATENT DOCUMENTS

| | | | |
|---|---|---|---|
| 93 08 361 U | 9/1993 | (DE) | H02G/15/08 |
| 0 409 444 A2 | 1/1991 | (EP) | H01R/4/24 |
| 2 269 485 | 2/1994 | (GB) | H01R/13/52 |

OTHER PUBLICATIONS

Search Report for German Application No. GB 9515502.4.

* cited by examiner

Primary Examiner—Dean A. Reichard
Assistant Examiner—William H Mayo, III

(57) ABSTRACT

Two-shell flat casings 10, 11 having an inner receptacle for low-viscosity gel precursor 13 which sets (preferably by curing) in receptacle and has displaceable wall 18 which is displaced by camming action 24,25 on closing together of the shells to allow the wires or other enclosed objects to extend out of the casing through space previously occupied by the displaced wall. Polysiloxane gels and glass-filled polypropylene casings are preferred, preferably molded as a single hinged piece with a hinge and frangible retaining webs for the displaceable wall. The design is well suited to high-volume automated production, e.g. for the automotive wiring market.

30 Claims, 3 Drawing Sheets

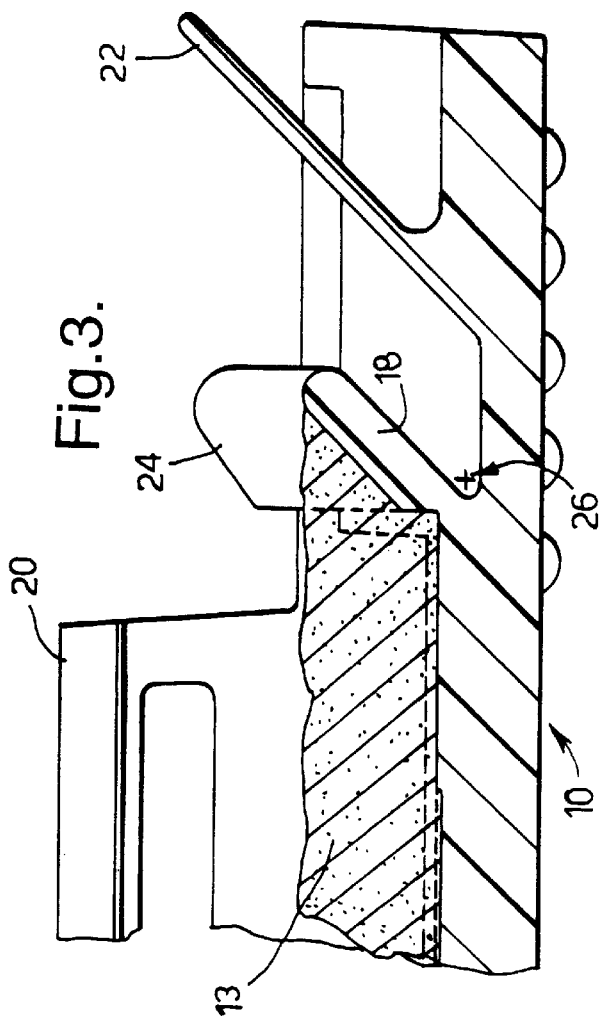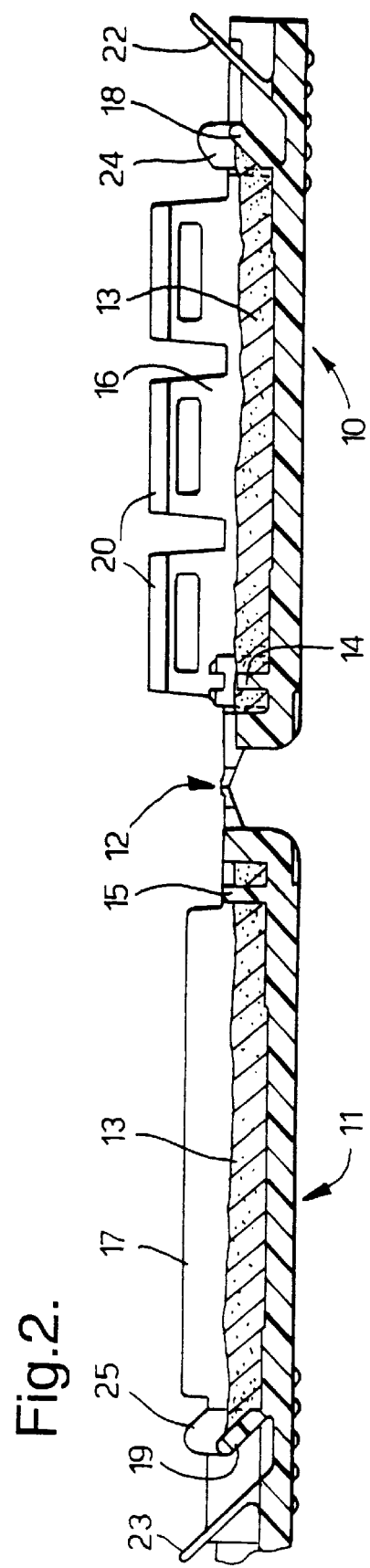

SEALING ENCLOSURE DEVICE

BACKGROUND OF THE INVENTION

1. Field of the Invention

This invention relates to devices for enclosing portions of elongate objects, for example electrical wire connectors, and sealant material, preferably gel, to protect the said objects against contamination.

2. Brief Description of the Background Art

Gel-containing enclosures for many purposes are known, for example from EP-A-0108518 (MP0838) and many subsequent patents. The present invention is concerned with new forms of enclosure devices which have outstanding advantages, especially in certain arrangements hereinafter described.

SUMMARY OF THE INVENTION

The invention accordingly provides a device for enclosing portions of elongate objects and sealant material, comprising at least two (preferably only two) casing members closeable together to enclose the said portions of the objects in use, at least one of the casing members having a floor portion and upstanding walls forming a receptacle (preferably substantially leakproof) capable of receiving settable fluid sealant material and retaining it (preferably all of it, although some leakage may be acceptable in some circumstances) until set, wherein at least one of the said upstanding walls is arranged for displacement by contact with one or more displacing parts of the other said casing member upon closure.

This invention has the advantage that a relatively thin flat layer of sealant can be conveniently formed in the casing members, even when the sealant material has a low initial viscosity and a long setting time (for example the polysiloxane gels described in the aforementioned EP-A-0108518), and can then be used to seal around elongate objects extending from the device substantially parallel to the surface of the sealant, thus making it possible to maintain a low (preferably substantially flat) profile for the objects and the device. Without such displacement, the walls needed to retain the sealant until it has set would interfere with the extending objects on closure of the sealing device about them. The displaceable walls also have advantages of greater robustness in manufacture and use of the sealing enclosure device than would be achievable by frangible walls thin enough to be broken by lateral pressure of the objects on the top of the walls on closure of the device. This displacement of the displaceable wall could in some circumstances allow the sealant to flow around the enclosed objects or into other desired positions, but it is usually preferable that the sealant be substantially non-flowable, especially preferably in a gel state, prior to the closing of the device which displaces the wall.

References herein to the settable fluid sealant material include materials which are initially in a fluid molten state and subsequently set in the said receptacle by cooling, for example greases, mastics, or thermoplastic gels, especially oil-extended styrene-hydrogenated alkylene-styrene triblock copolymer gels with added polyphenylene ether for improved temperature performance as described in WO-A-8800603 (RK308). Materials which set by chemical reaction, preferably polysiloxane gel-forming materials, may, however, be preferred, especially for some high-temperature uses such as protecting wiring connections in the hotter parts of automotive wiring harnesses and assemblies.

BRIEF DESCRIPTION OF THE DRAWINGS

FIG. 2 shows a side view in cross section taken on the lines 2—2 of FIG. 1.

FIG. 3 is an enlarged view of the displaceable wall region shown on the right hand side of FIG. 2.

Figure 1:
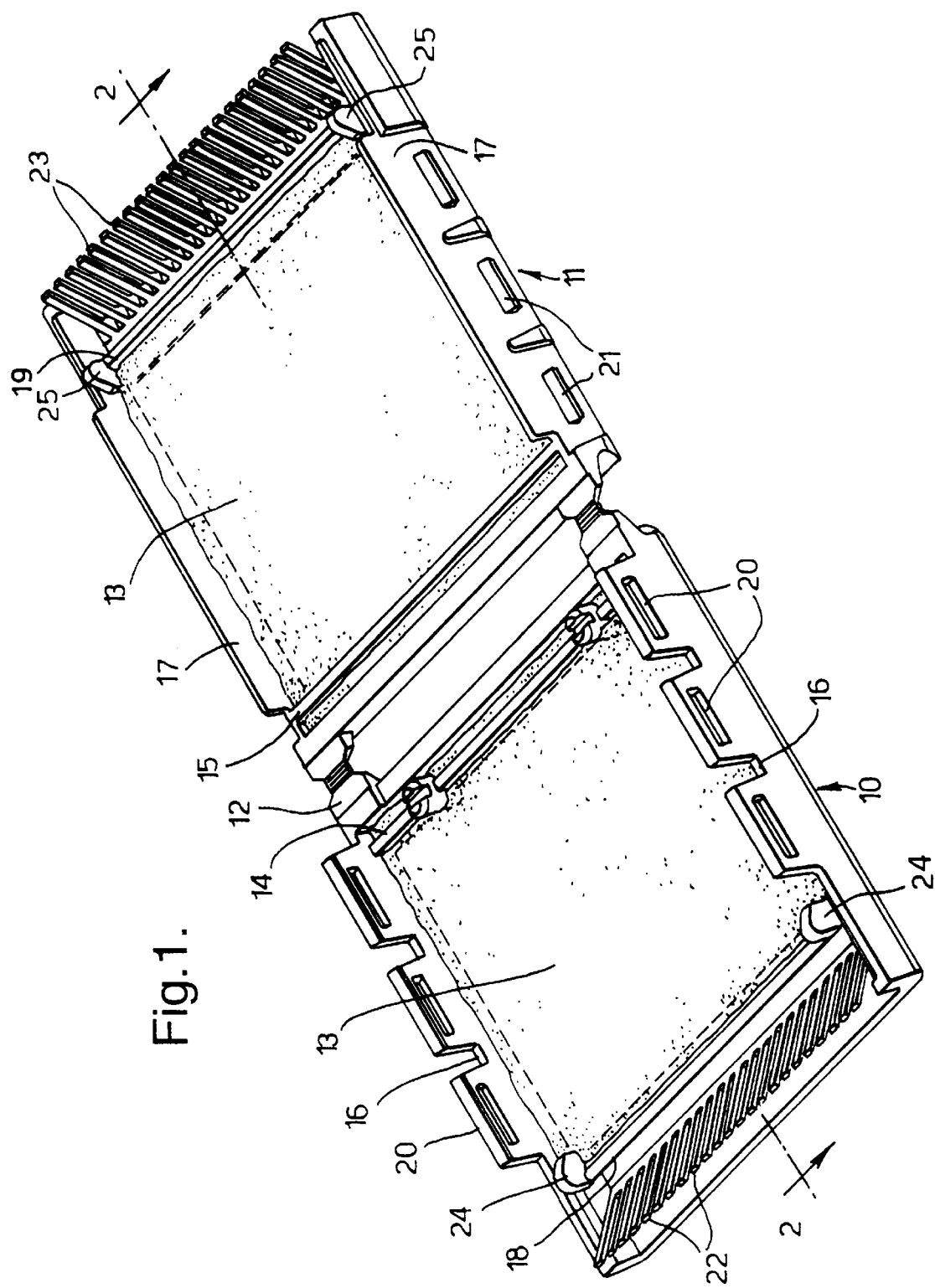
FIG. 1 shows, in perspective, a device according to the invention, the device comprising two hinged casing members containing a gel sealant.

It is usually preferred that the casing members are arranged so that when they are closed together in use to enclose the said portions of the objects, the said portions of the objects are at least partly within the said receptacle and extend therefrom through space previously occupied by the displaced wall. It can readily be envisaged that elongate objects such as wires are pressed laterally into the layer of sealant, preferably gel, upon closure of the casing members around the objects. The displaceable wall is thus highly advantageous, since it permits setting, preferably automated filling and setting, of even very-low-initial-viscosity sealant material, such as the aforementioned polysiloxane gels, while still enabling the objects to be pressed into the set gel in the flattest possible configuration for advantageous space saving, for example in applications where space is at a premium, such as automotive or other high performance vehicle wiring.

In most cases, the said receptacle has at least two upstanding walls, preferably four upstanding walls, the receptacle preferably being substantially rectangular, and the displaceable wall constitutes substantially the whole of one of the upstanding walls. The receptacle could, for example, be formed by a single curved wall, the ends of which connect with the ends of a single displaceable (preferably substantially straight) wall, although four upstanding walls in substantially rectangular arrangement will be preferable for many purposes. Substantially straight walls may be preferable in all cases. The ends of the respective walls will be defined by discernible meeting points, although not necessarily sharp or square corners, and the cross-sectional shape of the walls need not be constant or regular along their length.

In some preferred arrangements, the said displacing part(s) is(are) arranged to contact at least one (preferably both) end region(s) of the displaceable wall to bring about the said displacement in use. In such cases, it is preferred that the said end region(s) of the displaceable wall is(are) enlarged to form a cam or lever on which the said displacing part bears to effect the said displacement in use.

It is usually convenient that the displaceable wall is hinged to the casing member carrying it and the arrangement is such that the said displacement in use involves hinging movement of the displaceable wall towards the floor portion. The hinge is preferably "a living hinge" formed by molding of the casing member, and in embodiments of the invention designed to be closed seldom or only once, acceptable hinge performance can unexpectedly be achieved even with surprisingly high glass or other strengthening filler contents (e.g. 40% by weight) in the casing material. Preferably, the arrangement is such that substantially the whole length of the displaceable wall is displaced upon closure of the casing members together in use. Other arrangements of the displaceable wall in the device and other mechanisms for displacement are not, however, excluded.

In especially preferred embodiments of the present invention, frangible webs connect each end of the displaceable wall to an adjacent wall, the webs being frangible by forces they encounter during the displacement of the displaceable wall in use. It will be appreciated that such frangible webs can be made very short, bridging only a small space between the end of the displaceable wall and an adjacent wall, such a structure being advantageously more robust for molding and subsequent use than a long frangible wall which might be subject to breakage or distortion during manufacture. A robust displaceable wall with relatively short frangible webs will be advantageous for high speed production, e.g. by injection molding, for markets where high volume production is required, for example the automotive wiring market. Preferably the webs are notched to propagate tearing.

Devices according to this invention include those with the receptacle having only one displaceable wall so that the elongate objects in use extend from the device substantially in a single direction; and those with the receptacle having at least two displaceable walls so that the elongate objects in use can extend from the device in at least two directions inclined to each other preferably at an angle of at least 60° C., more preferably at least 90° C., especially preferably substantially 180° C.

In many cases, it will be preferable that the said other casing member forms a second receptacle with at least one displaceable wall and any of the features hereinbefore specified for such receptacles and displaceable walls may apply mutatis mutandis in any combination to the second receptacle and its displaceable wall(s). Thus, although a single receptacle-forming casing member with a "lid-forming" second casing member may be useful for some purposes, it will usually be preferable for the two casing members to resemble each other fairly closely, perhaps as mirror-images in some respects, while allowing for variations to enable them to be conveniently fitted and secured together. Preferably, the casing members are molded as integral units of plastics material, preferably polypropylene. Suitable known molding methods and equipment can readily be selected by those skilled in such technology. Polypropylene containing 40% by weight glass fibre filler is a preferred casing material, although other moldable polymers may be selected to suit conditions of manufacture and/or end use. Preferably, the casing members are hinged together ready for the said closure in use, preferably by formation of a hinge during a molding process which forms both casing members together. The casing members may be secured together in any convenient way after closure, preferably being snap-fittable together to secure the said closure.

As aforementioned, the device is preferably shaped to fit closely around portions of a substantially flat array of elongate objects, preferably electrical wires, the diameter of the largest enclosed object preferably being not more than 4 times, more preferably not more than twice, the diameter of the smallest enclosed object. The devices of the present invention, especially when the cohesive and conformable preferred gel sealants are used, can advantageously accommodate variations in the sizes and numbers of objects such as wires to be enclosed.

The invention naturally includes the device with the said sealant material present in the said receptacle(s), the sealant material preferably being a gel, more preferably a cross-linked polysiloxane gel, as hereinbefore mentioned, the disclosure of EP-A-0108518 in this respect being incorporated herein by reference. Suitable polysiloxane gels, or other chemically cross-linkable gels such as polyurethanes, or thermoplastic gels, preferably oil-extended tri-block copolymer gels, as known per se, may be selected according to convenience and end use requirements. The polysiloxane gels, which tend to provide superior temperature performance, have particularly low initial viscosity and a relatively long cure time for the cross-linking reaction to polymerize them into a set state, and are thus likely to benefit especially from the retentive receptacle and displaceable wall of the present invention. The devices according to the invention are especially well suited to automated filling of the sealant material into injection-molded casings, all being conducive to high production speeds desirable for high volume automotive and other markets as aforesaid. The invention naturally also includes the devices when closed together in use about the said elongate objects, preferably electrical wires, although the invention may also be useful with optical fibres or other elongate objects.

DETAILED DESCRIPTION OF THE INVENTION

Figure 4:
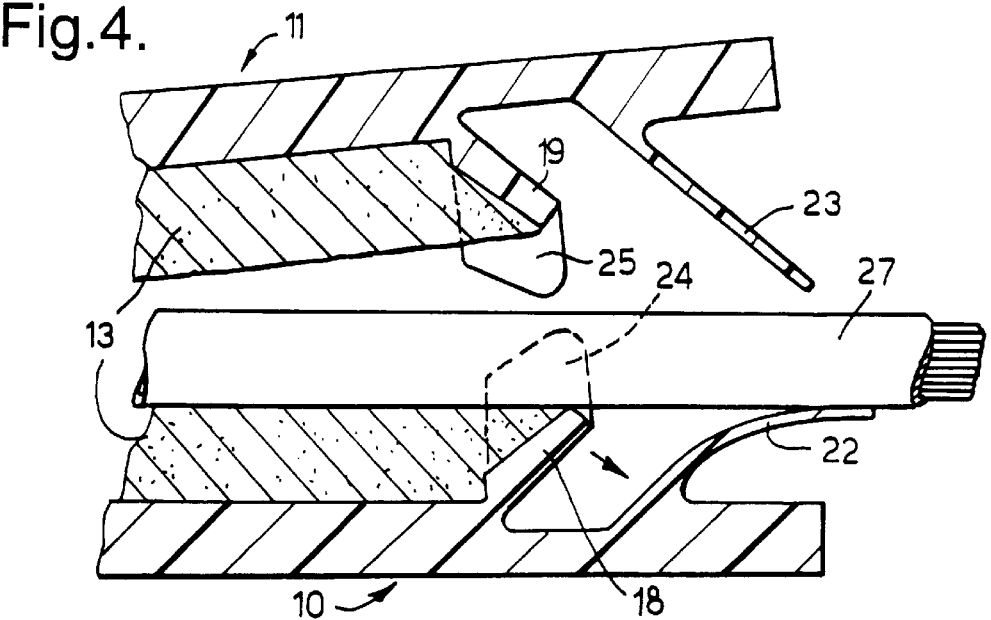
FIGS. 4, 5, and 6 show three stages of steps, in an enlarged view, where the displaceable wall regions of the device shown in FIG. 2 are closed around an electrical wire.
Figure 5:
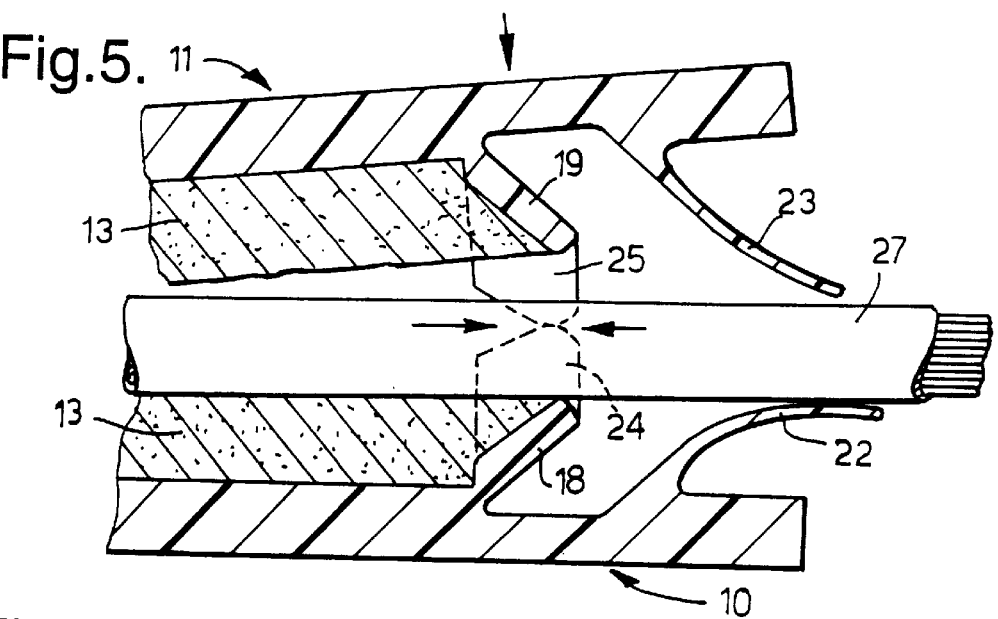
Figure 6:
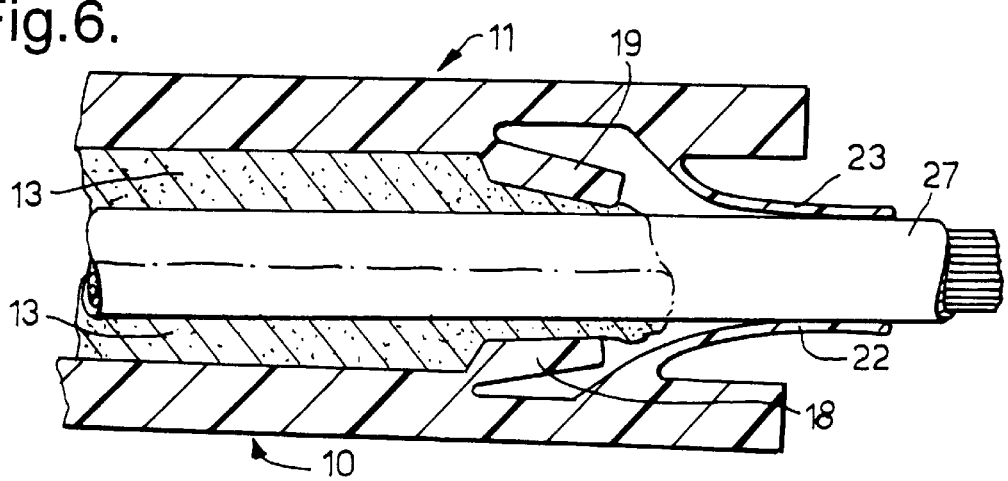

Specific embodiments of the present invention will now be described by way of example with reference to the accompanying drawings, wherein:

FIG. 1 shows in perspective a device according to the invention comprising two hinged casing members containing gel sealant;

FIG. 2 shows a side view in cross section taken on the lines 2—2 of FIG. 1;

FIG. 3 is an enlarged view of the displaceable wall region shown on the right hand side of FIG. 2; and FIGS. 4 to 6 show the displaceable wall region of both casing members of the device in three stages of closure around an electrical wire.

Referring to FIGS. 1 and 2, casing members 10 and 11 are hinged together by living hinge 12, the casing members and hinge having been formed in one piece by injection molding of glass-fiber-filled polypropylene, the glass fiber content being 40% by weight of the whole composition. Gel 13 is shown in the receptacles formed in each of the casing members respectively by end walls 14 and 15, side walls 16 and 17, and displaceable end walls 18 and 19. The reactive liquid pre-cursor components of the gel are automatically filled into the receptacles on a continuous filling production line and allowed to remain there for a few hours while the polymerizing reaction forms the gel. The polysiloxane pre-cursor materials are well known and have a very low viscosity initially approaching that of water. After the cross-linking polymerization reaction of the polysiloxane components, the set gel is soft and flexible, and has strong cohesion demonstrated by a high elongation to break and by the ability of the respective gel bodies, after being brought together face to face as hereinafter described, to separate cleanly at the interface between them, which is advantageous for re-entry where repair or alteration of the enclosed objects is desired. Snap-fit closure means 20 and 21 are provided on the side walls 16, 17 to secure the two casing members together on closure. Flexible fingers 22, 23 are provided to give extra protection at the open end of the device from which the enclosed objects such as wires will project after closure.

As shown in more detail in FIG. 3, the displaceable end walls 18, 19 have at their ends enlarged portions 24, 25, which provide camming surfaces for the displacement of the end walls 18, 19 upon closure of the device. The end walls are molded with a suitably weakened or hinged portion 26 to facilitate the displacement. The walls 18 and 19 are secured in the upright position as illustrated by very short frangible plastics webs (not visible in these illustrations) extending between each camming member 24 or 25 and its adjacent side wall 16 or 17, which webs are broken by the displacement action of the camming surfaces upon closure of the device.

In FIGS. 4 to 6, a wire 27 is shown as representative of a substantially flat array of wires (viewed edge-on) with which the device is especially useful, for example in enclosing and protecting a flat multi-wire connector of a type known in the automotive wiring industry. As closure of the device around the wires progresses from FIG. 4 through FIG. 5 to FIG. 6, the flexible fingers 22, 23 are progressively bent aside as they come into contact with the wires and/or with each other and the camming members 24, 25 make contact (FIG. 5) and progressively displace the end walls 18, 19 from their initial upright position (FIG. 5) to a flattened position (FIG. 6) with consequent rupture of the aforementioned frangible webs. These webs are provided not only to retain the end walls more strongly in the initial upright position, but also to prevent leakage of low-viscosity gel forming reactants around the ends of the displaceable wall. As the position shown in FIG. 6 is approached, the snap-fit securing members 20, 21 engage to lock the device in the closed position. Snap fir securing members 20, 21 are not shown in FIG. 6, but can be seen in FIGS. 1 and 2.

What is claimed is:

1. A device for enclosing portions of elongate objects and scalant material, comprising at least two casing members closeable with each other to enclose the portions of the objects in use, at least one of the casing members having a floor portion and upstanding walls forming a receptacle capable of receiving settable fluid sealant material and retaining it until set, wherein at least one of said upstanding walls is arranged for displacement and at least one of said walls arranged for displacement is displaceable essentially by contact with one or more displacing parts of an other said casing member upon closure.

2. A device according to claim 1 wherein said at least two casing members are arranged so that when they are closed with each other in use to enclose the portions of the objects when present, the portions of the objects when present are at least partly within said receptacle and extend therefrom through space previously occupied by said at least one of said walls arranged for displacement.

3. A device according to claim 1 wherein said receptacle has at least two upstanding walls, and wherein said at least one of said walls arranged for displacement constitutes substantially all of one of said upstanding walls.

4. A device according to claim 1, wherein at least one of said walls arranged for displacement is substantially straight.

5. A device according to claim 1, wherein said one or more displacing parts is arranged to contact at least one end region of at least one of said walls arranged for displacement to bring about the displacement in use.

6. A device according to claim 5, wherein the end region of at least one of said walls arranged for displacement is enlarged to form a cam or lever on which said one or more displacing parts bears to effect said displacement in use.

7. A device according to claim 1, wherein at least one of said walls arranged for displacement is hinged to said at least one of said at least two casing members carrying it such that said displacement in use involves hinging movement of at least one of said walls arranged for displacement.

8. A device according to claim 1 wherein said arrangement is such that substantially all of at least one of said walls is displaced upon closure of said at least two casing members with each other in use.

9. A device according to claim 1 wherein said receptacle has only one wall arranged for displacement so that the elongate objects when present in use extend from said device substantially in a single direction.

10. A device according to claim 1, wherein said receptacle having at least two walls arranged for displacement so that the elongate objects when present in use can extend from said device in at least two directions inclined to each other at an angle of at least 60°.

11. A device according to claim 1 wherein each of said at least two casing members has a set of said upstanding walls, at least one of the walls in each respective set being arranged for displacement essentially by contact with one or more displacement parts on another of said at least two casing members.

12. A device according to claim 11, wherein at least one end region of at least one of said walls arranged for displacement is enlarged to form a can or lever formation and wherein said at least one of said walls arranged for displacement of each casing member incorporates said cam or lever formation and said formation on each casing member bears on a corresponding formation of a respective casing member to effect said displacement.

13. A device according to claim 1, wherein said casing members are molded as integral units of a plastic material.

14. A device according to claim 13, wherein said casing members are molded as integral units of polypropylene.

15. A device according to claim 1, wherein said casing members are hinged together ready for said closure in use by formation of a hinge molded as integral units of a plastic material.

16. A device according to claim 1, wherein said casing members are snap-fittable together to secure said closure.

17. A device according to claim 1, said casing members being shaped to fit closely around portions of a substantially flat array of elongate objects, wherein a diameter of a largest enclosed object when present is not more than 4 times greater than a diameter of the smallest enclosed object when present.

18. A device according to claim 17, wherein said casing members are closed together about the elongate objects, wherein the objects are electrical wires.

19. A device according to claim 1, wherein said sealant material is present in said receptable.

20. A device according to claim 19, wherein said sealant material is a gel.

21. A device according to claim 20, wherein said gel is a cross-linked polysiloxane gel.

22. A device according to claim 1, comprising two casing members.

23. A device according to claim 22, wherein said at least one of said walls arranged for displacement is substantially straight.

24. A device according to claim 23, wherein said one or more displacing parts is arranged to contact at least one end region of at least one of said walls arranged for displacement to bring about said displacement in use.

25. A device according to claim 24, wherein said end region of said at least one of said walls arranged for displacement is enlarged to form a cam or lever on which said displacing part bears to effect said displacement in use.

26. A device according to claim 25, wherein said at least one of said walls arranged for displacement is hinged to at least one of said at least two casing members having a floor carrying said at least one of said walls and said arrangement is such that said displacement in use involves hinging movement of said at least one of said walls arranged for displacement.

27. A device according to claim 26, wherein said arrangement is such that substantially all of the at least one of said walls arranged for displacement is displaced upon closure of said casing members together in use.

28. A device according to claim 27 wherein said receptacle has at least two walls arranged for displacement, so that said elongate objects when present in use can extend from said device in at least two directions inclined to each other at an angle of 60°.

29. A device according to calim 1, wherein said receptacle has four upstanding walls and said receptacle is substantially rectangular.

30. A device according to calim 1, wherein two of the casing members each have a said at least one of said walls arranged for displacement and respective walls are displaceable essentially upon contact with each other.

* * * * *